(12) United States Patent
Schmitt et al.

(10) Patent No.: US 9,983,356 B2
(45) Date of Patent: *May 29, 2018

(54) OPTICAL BUFFER-BASED APPARATUS FOR INCREASING LIGHT SOURCE REPETITION RATE

(71) Applicant: LightLab Imaging, Inc., Westford, MA (US)

(72) Inventors: Joseph M. Schmitt, Andover, MA (US); Desmond Adler, Melrose, MA (US)

(73) Assignee: LIGHTLAB IMAGING, INC., Westford, MA (US)

( * ) Notice: Subject to any disclaimer, the term of this patent is extended or adjusted under 35 U.S.C. 154(b) by 135 days.

This patent is subject to a terminal disclaimer.

(21) Appl. No.: 14/853,078

(22) Filed: Sep. 14, 2015

(65) Prior Publication Data

US 2016/0070066 A1 Mar. 10, 2016

Related U.S. Application Data

(63) Continuation of application No. 13/077,075, filed on Mar. 31, 2011, now Pat. No. 9,164,240.

(51) Int. Cl.
*G02B 6/28* (2006.01)
*G01B 9/02* (2006.01)
*G02B 6/35* (2006.01)

(52) U.S. Cl.
CPC ....... *G02B 6/2861* (2013.01); *G01B 9/02004* (2013.01); *G01B 9/02091* (2013.01); *G02B 6/2808* (2013.01); *G02B 6/3502* (2013.01)

(58) Field of Classification Search
CPC .. G01B 9/02028; G01B 9/02027; G01B 9/02; G01B 9/02091; G02B 6/2861;
(Continued)

(56) References Cited

U.S. PATENT DOCUMENTS 5,263,037 A 11/1993 Trutna, Jr. et al.
5,321,501 A 6/1994 Swanson et al.
(Continued)

FOREIGN PATENT DOCUMENTS

EP 0 524 382 1/1993
WO 03096106 11/2003
WO 2009137659 11/2009

OTHER PUBLICATIONS

Aljada et al., "Experimental demonstration of a tunable laser using an SOA and an Opto-VLSI Processor," Optic Express, 15(15):9666-9671, Jul. 23, 2007.
(Continued)

*Primary Examiner* — Michael P Lapage
(74) *Attorney, Agent, or Firm* — K&L Gates LLP

(57) ABSTRACT

In one embodiment, the invention relates to an apparatus for increasing the repetition rate in a light source. The apparatus includes a first optical coupler comprising a first arm, a second arm and a third arm; a first mirror in optical communication with the second arm of the first optical coupler; and a first optical delay line having a first end in optical communication with the third arm of the first optical coupler and a second end in optical communication with a second mirror, wherein light entering the first arm of the first optical coupler leaves the first arm of the first optical coupler either delayed by an amount ($\tau$) or substantially undelayed.

15 Claims, 15 Drawing Sheets

(58) Field of Classification Search
CPC .......... G02B 6/3502; G02B 6/27; G02B 6/26; G02B 6/35; F21V 11/00
See application file for complete search history.

(56) References Cited

U.S. PATENT DOCUMENTS

| | | | |
|---|---|---|---|
| 5,459,570 A | 10/1995 | Swanson et al. | |
| 5,465,147 A | 11/1995 | Swanson | |
| 5,491,577 A | 2/1996 | Gautheron et al. | |
| 5,500,762 A | 3/1996 | Uchiyama et al. | |
| 5,509,093 A | 4/1996 | Miller et al. | |
| 5,574,739 A | 11/1996 | Carruthers et al. | |
| 5,619,368 A | 4/1997 | Swanson | |
| 5,748,598 A | 5/1998 | Swanson et al. | |
| 5,784,352 A | 7/1998 | Swanson et al. | |
| 5,956,355 A | 9/1999 | Swanson et al. | |
| 5,991,477 A | 11/1999 | Ishikawa et al. | |
| 6,111,645 A | 8/2000 | Tearney et al. | |
| 6,134,003 A | 10/2000 | Tearney et al. | |
| 6,160,826 A | 12/2000 | Swanson et al. | |
| 6,191,862 B1 | 2/2001 | Swanson et al. | |
| 6,282,011 B1 | 8/2001 | Tearney et al. | |
| 6,282,215 B1 | 8/2001 | Zorabedian et al. | |
| 6,373,632 B1 | 4/2002 | Flanders et al. | |
| 6,421,164 B2 | 7/2002 | Tearney et al. | |
| 6,445,939 B1 | 9/2002 | Swanson et al. | |
| 6,485,413 B1 | 11/2002 | Boppart et al. | |
| 6,501,551 B1 | 12/2002 | Tearney et al. | |
| 6,552,796 B2 | 4/2003 | Magnin et al. | |
| 6,564,087 B1 | 5/2003 | Pitris et al. | |
| 6,570,659 B2 | 5/2003 | Schmitt | |
| 6,608,711 B2 | 8/2003 | Flanders et al. | |
| 6,706,004 B2 | 3/2004 | Tearney et al. | |
| 6,816,515 B1 | 11/2004 | Yun et al. | |
| 6,847,662 B2 | 1/2005 | Bouda et al. | |
| 6,856,386 B2 | 2/2005 | Anderson et al. | |
| 6,879,851 B2 | 4/2005 | McNamara et al. | |
| 6,891,984 B2 | 5/2005 | Petersen et al. | |
| 6,985,234 B2 | 1/2006 | Anderson | |
| 7,061,618 B2 | 6/2006 | Atia et al. | |
| 7,061,621 B2 | 6/2006 | Krause | |
| 7,061,622 B2 | 6/2006 | Rollins et al. | |
| 7,075,058 B2 | 7/2006 | Chinn et al. | |
| 7,208,333 B2 | 4/2007 | Flanders et al. | |
| 7,231,243 B2 | 6/2007 | Tearney et al. | |
| 7,241,286 B2 | 7/2007 | Atlas | |
| 7,260,126 B2 | 8/2007 | Wang et al. | |
| 7,373,089 B2 | 5/2008 | Yu et al. | |
| 7,414,779 B2 | 8/2008 | Huber et al. | |
| 7,415,049 B2 | 8/2008 | Flanders et al. | |
| 7,534,990 B2 | 5/2009 | Yao | |
| 7,538,935 B2 | 5/2009 | Gaeta et al. | |
| 7,625,366 B2 | 12/2009 | Atlas | |
| 7,813,609 B2 | 10/2010 | Petersen et al. | |
| 7,843,976 B2 | 11/2010 | Cable et al. | |
| 7,848,791 B2 | 12/2010 | Schmitt et al. | |
| 7,884,945 B2 | 2/2011 | Srinivasan et al. | |
| 7,916,387 B2 | 3/2011 | Schmitt et al. | |
| 7,935,060 B2 | 5/2011 | Schmitt et al. | |
| 7,936,462 B2 | 5/2011 | Jiang | |
| 8,315,282 B2 | 11/2012 | Huber et al. | |
| 8,358,461 B2 | 1/2013 | Huber et al. | |
| 8,405,834 B2 | 3/2013 | Srinivasan et al. | |
| 8,582,619 B2 | 11/2013 | Adler | |
| 8,687,201 B2 | 4/2014 | Adler | |
| 8,810,901 B2 | 8/2014 | Huber et al. | |
| 8,855,149 B2 | 10/2014 | Huber et al. | |
| 8,923,349 B2 | 12/2014 | Huber et al. | |
| 8,934,507 B2 | 1/2015 | Huber et al. | |
| 8,948,228 B2 | 2/2015 | Adler | |
| 2002/0054614 A1 | 5/2002 | Jin | |
| 2002/0161351 A1 | 10/2002 | Samson et al. | |
| 2003/0179790 A1 | 9/2003 | Bouda et al. | |
| 2005/0078716 A1 | 4/2005 | Liu | |
| 2005/0201662 A1 | 9/2005 | Petersen et al. | |
| 2005/0203338 A1 | 9/2005 | Couvillon et al. | |
| 2005/0213103 A1 | 9/2005 | Everett et al. | |
| 2005/0254061 A1* | 11/2005 | Alphonse | A61B 5/0066 356/479 |
| 2005/0265402 A1 | 12/2005 | Tanaka et al. | |
| 2006/0095065 A1 | 5/2006 | Tanimura et al. | |
| 2006/0103850 A1 | 5/2006 | Alphonse et al. | |
| 2006/0109872 A1 | 5/2006 | Sanders | |
| 2006/0187537 A1 | 8/2006 | Huber et al. | |
| 2007/0008545 A1 | 1/2007 | Feldchtein et al. | |
| 2008/0049229 A1 | 2/2008 | Feldchtein | |
| 2008/0165366 A1 | 7/2008 | Schmitt | |
| 2008/0177183 A1 | 7/2008 | Courtney et al. | |
| 2009/0046295 A1 | 2/2009 | Kemp et al. | |
| 2009/0103100 A1 | 4/2009 | Froggatt et al. | |
| 2009/0174931 A1 | 7/2009 | Huber et al. | |
| 2009/0306520 A1 | 12/2009 | Schmitt et al. | |
| 2010/0076320 A1 | 3/2010 | Petersen et al. | |
| 2010/0094127 A1 | 4/2010 | Xu | |
| 2010/0103426 A1 | 4/2010 | Kim et al. | |
| 2010/0103964 A1 | 4/2010 | Huber | |
| 2010/0253949 A1 | 10/2010 | Adler et al. | |
| 2010/0254415 A1 | 10/2010 | Oh et al. | |
| 2010/0272432 A1 | 10/2010 | Johnson | |
| 2011/0007315 A1 | 1/2011 | Petersen et al. | |
| 2011/0051143 A1 | 3/2011 | Flanders et al. | |
| 2011/0051148 A1 | 3/2011 | Flanders et al. | |
| 2011/0071404 A1 | 3/2011 | Schmitt et al. | |
| 2011/0071405 A1 | 3/2011 | Judell et al. | |
| 2011/0101207 A1 | 5/2011 | Schmitt | |
| 2011/0151980 A1 | 6/2011 | Petroff | |
| 2012/0194823 A1 | 8/2012 | Moore et al. | |
| 2013/0058364 A1 | 3/2013 | Huber et al. | |
| 2014/0369374 A1 | 12/2014 | Huber et al. | |
| 2015/0055136 A1 | 2/2015 | Huber et al. | |

OTHER PUBLICATIONS

Eigenwillig et al., "Wavelength Swept ASE Source," Proceedings of the SPIE—The International Society for Optical Engineering SPIE—The International Society for Optical Engineering USA, vol. 7372, 2009, 4 pgs.

Takada et al., "Loss distribution measurement of silica-based waveguides by using a jaggedness-free optical low coherence reflectometer," Electronics Letters, 30(17)1441-1443, Aug. 18, 1994.

Takada et al., "Tunable Narrow-Band Light Source Using Two Optical Circulators," IEEE Photonics Technology Letters, 9(1):91-93, Jan. 1997.

Huber et al., "Amplified, Frequency Swept Lasers for Frequency Domain Reflectometry and OCT Imaging: Design and Scaling Principles", Optics Express 13:9, May 2, 2005 (16 pages).

Chang T. et al., Pulsed Dye-Laser with Grating and Etalon in a Symmetric Arrangement. Appl. Opt. 1980; 19 (21): 3651-3654.

Huber, R., et al., "Fourier Domain Mode Locked Lasers for OCT imaging at up to 290 kHz sweep rates," Proc. of SPIE-OSA Biomedical Optics, SPIE vol. 5861: (2005).

Klauminzer, GK, "Etalon-Grating Synchronized Scanning of a Narrowband Pulsed Dye Laser," Optical Engineering 1974; 13 (6): p. 528-530.

Shimizu, K., et al., "Measurement of Rayleigh Backscattering in Single-Mode Fibers Based on Coherent OFDR Employing a DFB Laser Diode," IEEE Photonics Technology Letters, 3(11): 1039-1041 (1991).

Takada, K. et al., "Rapidly-tunable narrowband light source with symmetrical crossing configuration for low coherence reflectometry," Electronics Letter, Jan. 5, 1995, vol. 31 (1) p. 63-65.

Takesue et al., "Broad-Band Lightwave Synthesized Frequency Sweeper Using Synchronous Filtering," J. of Lightwave Technology, 22(3): 755-762 (2004).

Telle et al., "Very rapid tuning of cw dye laser," Applied Physics Letters, 26(10): 572-574 (1975).

Yun, S.H., et al., "High-speed wavelength-swept semiconductor laser with a polygon-scanner-based wavelength filter," Optics Letters, 28(20): 1981-1983 (2003).

(56) References Cited

OTHER PUBLICATIONS

Yun, S.H., et al., "Interrogation of fiber grating sensor arrays with a wavelength-swept fiber laser," Optics Letters, 23 (11): 843-845 (1998).
Yun, S.H., et al., "Wavelength-Swept Fiber Laser with Frequency Shifted Feedback and Resonantly Swept Intra-Cavity Acoustooptic Tunable Filter," IEEE Journal of Selected Topics in Quantum Electronics, 3(4): 1087-1096 (1997).
Written Opinion of the International Searching Authority dated Jul. 15, 2010 (8 pgs.).
Morin et al., "Dispersion Control for Ultrafast Optics", TeraXion, 2009 (10 pgs.).
Biedermann et al., "Dispersion, coherence and noise of Fourier domain mode locked lasers", Optics Express 17(12): 9947-9961 (2009).
Bilenca et al., "Numerical study of wavelength-swept semiconductor ring lasers: the role of refractive-index nonlinearities in semiconductor optical amplifiers and implications for biomedical imaging applications", Optics Letters 31(6): 760-762 (2006).
Potsaid et al., "Ultrahigh Speed 1050nm Swept Source / Fourier Domain OCT Retinal and Anterior Segment Imaging at 100,000 to 400,000 Axial Scans Per Second" Optics Express 18. 19 (2010): 20029 (27 pages).

\* cited by examiner

OPTICAL BUFFER-BASED APPARATUS FOR INCREASING LIGHT SOURCE REPETITION RATE

CROSS REFERENCE TO PRIOR APPLICATIONS

This application is a continuation of U.S. patent application Ser. No. 13/077,075 filed on Mar. 31, 2011, the disclosure of which is herein incorporated by reference in its entirety.

FIELD OF INVENTION

This invention relates generally to the field of frequency-tunable light sources and more specifically to their application in optical measurement and imaging systems.

BACKGROUND

New applications of measurement and imaging systems that employ tunable light sources demand increasingly higher data acquisition rates. For example, although the latest generation of frequency-domain optical coherence tomography (OCT) systems for imaging of coronary arteries acquire image data at 50,000 lines/sec, even faster speeds are necessary to scan the full lengths of the major coronary branches. Scanning spectrometers must also operate at higher speeds to permit rapid analysis of atmospheric aerosols and contaminants over large areas, hyperspectral imaging of moving targets, detection of chemical substances in multiple samples, and other applications.

One of the major impediments to higher speed operation of frequency-domain systems, especially systems that operate continuously over a wide spectral range, is the sweep repetition rate of the light source. Many high-speed wavelength-swept light sources employ mechanically actuated filters that are excited by a substantially periodic waveform with a frequency close to the resonance of the filter. When operated at very high speeds, many tunable light sources produce a usable output over less than 50% of the sweep period of the filter. This occurs because the time required to build up stimulated emission limits the available optical gain within the filter bandpass. Even if the build-up time of the gain element does not limit the scanning speed for a given application, the non-linearities of the gain element can broaden the line width of the source. Such undesirable broadening can occur during either the up sweep (the portion of the sweep over which the wavelength increases) or the down sweep (the portion of the sweep over which the wavelength decreases), such that a significant portion of the sweep becomes unusable. Moreover, to ease the demands on the data acquisition system, it is often desirable to acquire data only during the portion of the sweep when the rate of change of the optical frequency is approximately constant. These factors impose an upper limit on the effective duty cycle of continuously swept light sources.

A method for increasing the repetition rate of a light source using time-multiplexing was first introduced in the context of the design of Fourier-domain mode-locked lasers. This method, referred to here as 'optical buffering', is based on combining the output of the swept laser with a delayed version of the swept laser output, which is inserted within the interval between laser sweeps during the time when the laser gain medium is turned off or is inactive.

In a conventional buffer, the delayed version of the laser output is generated by splitting off a fixed fraction (~50%) of the laser output with an optical coupler, storing the laser output in a spool of fiber and then recombining the original and delayed laser outputs using a second optical coupler. The length of the fiber is given by $L=nc\tau$, where $\tau$ is the desired delay time, c is the speed of light and n is the refractive index of the fiber. Using such an optical buffering apparatus, the effective repetition rate of a laser with an original duty cycle less than 50% can be doubled. A second optical buffering stage can be added to quadruple the duty cycle of a swept laser with an original duty cycle less than 25%.

With respect to their commercial use in imaging or spectroscopy systems, the optical buffering configurations that have been disclosed previously need to employ a polarization controller to align the polarization states of the original and delayed versions of the laser output if a consistent sweep-to-sweep polarization state is desired. One polarization controller is required for each stage of buffering. To compensate for environmental effects on the birefringence of the spooled optical fiber, a means of adjusting each polarization controller continuously to maintain alignment of the polarization states is required. These requirements increase system cost and complexity.

Additionally, the optical throughput of such conventional optical buffer configurations is relatively low. For example, the optical loss of a conventional buffer, configured for doubling the laser repetition rate, exceeds 3 dB, because at least one-half of the light is lost in the single-mode coupler that combines the original and delayed laser outputs. In certain applications, an optical power loss of this magnitude can negatively impact a system's signal-to-noise ratio.

The present invention addresses these issues.

SUMMARY OF THE INVENTION

In its various embodiments, the present invention is designed to overcome the main drawbacks—polarization misalignment and high optical losses—from which conventional optical time-multiplexing methods for laser sweep-rate multiplication suffer.

In various embodiments, novel optical configurations are introduced that employ Faraday mirrors to compensate for alterations of the polarization states of the light transmitted through the buffering optics described in the prior art. In other embodiments, systems and apparatuses for reducing optical losses are disclosed.

In one such embodiment, an optical buffer is combined with an interferometer in an optical coherence tomography (OCT) system. In other embodiments of the invention, configurations of one or more optical elements that reduce losses are described such that couplers in conventional systems are replaced with optical buffers with fast optical switches. The states of such buffers are synchronized with an original portion and a delayed portion of the sweep of the light source. Some of the embodiments of the invention include elements or methods steps that either double or quadruple the optical repetition rate of a tunable or swept light source. However, in some embodiments, further repetition rate increases can be achieved by extensions or combinations of the concepts disclosed herein.

In one embodiment, the invention relates to an apparatus for increasing the repetition rate in a swept light source. The apparatus includes a first optical coupler having a first arm, a second arm and a third arm; a first mirror in optical communication with the second arm of the first optical coupler; and a first optical delay line having a first end in optical communication with the third arm of the first optical coupler and a second end in optical communication with a second mirror, wherein light entering the first arm of the first optical coupler leaves the first arm of the first optical coupler either delayed by an amount ($\tau$) or substantially undelayed.

In one embodiment, the first and second mirrors are Faraday mirrors. The apparatus can further include a three port circulator having a first port, a second port, and a third port. In turn, the first port of the three port circulator can be configured to receive light from the swept source. Further, the second port of the three port circulator can be in optical communication with the first arm of the first optical coupler. The apparatus can further include an optical isolator in optical communication with the first arm of the first optical coupler. The first optical coupler can further include a fourth arm, wherein the apparatus further includes an optical isolator in optical communication with the fourth arm of the first optical coupler.

In one embodiment, the first optical coupler further includes a fourth arm; and wherein the apparatus further includes a first polarization controller having a first controller end in optical communication with the third port of the three port circulator and having a second controller end; a second optical coupler that includes a first arm, a second arm and a third arm, the first arm of the second optical coupler in optical communication with the second end of the first polarization controller; and a second delay line having a first delay line end in optical communication with the fourth arm of the first optical coupler and having a second delay line end in optical communication with a second arm of the second optical coupler. In one embodiment, the second optical coupler can include a fourth arm and wherein the apparatus further includes an optical switch that includes a first input port, a second input port and an output port, wherein the first input port of the optical switch is in optical communication with the fourth output arm of the second optical coupler, and wherein the second input port of the optical switch is in optical communication with the third arm of the second optical coupler.

In one embodiment, the apparatus further includes a second optical coupler that includes a first arm, a second arm and a third arm; a third mirror in optical communication with the second arm of the second optical coupler; and a second optical delay line having a first end in optical communication with the third arm of the second optical coupler and a second end in optical communication with a fourth mirror; and a four port circulator that includes a first port in optical communication with the first arm of the first optical coupler and a second port in optical communication with the first arm of the second optical coupler; a third port in optical communication with the tunable light source; wherein light entering the first arm of the first optical coupler from the first port of the four port circulator, leaves the first arm of the first optical coupler and enters the first port of the four port circulator either delayed by an amount substantially equal to (0) or ($\tau$); and wherein light entering the first arm of the second optical coupler from the second port of the four port circulator, leaves the first arm of the second optical coupler and enters the second or third port of the four port circulator delayed by an amount substantially equal to 0, ($\tau$), ($\tau/2$) or ($\tau/4$). In one embodiment, the mirrors are Faraday mirrors.

In one embodiment, the invention relates to an apparatus for increasing the repetition rate in a tunable light source. The apparatus includes a first optical coupler that includes a first arm, a second arm and a third arm; a first polarization controller having a first port in optical communication with the second arm of the first optical coupler and having a second port; a first fiber optic delay line, having a first end and a second end, the first end of the first fiber delay line in optical communication with the third arm of the first optical coupler; and an optical switch that includes a first input port, a second input port and an output port, wherein the first input port of the optical switch is in optical communication with the second port of the first polarization controller and the second input port of the optical switch is in optical communication with the second end of the first delay line.

In one embodiment, the first optical coupler includes a fourth arm, and wherein the apparatus further includes a second optical coupler that includes a first arm, a second arm and a third arm; a second polarization controller having a first port in optical communication with the first arm of the second optical coupler and having a second port; and a second fiber optic delay line, having a first end and a second end, the first end of the second fiber delay line in optical communication with the second arm of the second optical coupler; wherein the second port of the second polarization controller is in optical communication with the first arm of the first optical coupler, and wherein the second end of the second fiber optic delay line is in optical communication with the fourth arm of the first optical coupler.

In one embodiment, the invention relates to an optical coherence tomography system. The system includes a first optical coupler that includes a first arm, a second arm, a third arm, and a fourth arm; a first mirror in optical communication with the second arm of the first optical coupler; and a first optical delay line having a first end in optical communication with the third arm of the first optical coupler and a second end in optical communication with a second mirror, wherein light entering the first arm of the first optical coupler leaves the first arm of the first optical coupler either delayed by an amount substantially equal to ($\tau$) or substantially undelayed; a four port circulator, wherein the first port of the four port circulator is in optical communication with a light source; wherein the second port of the four port circulator is in optical communication with the first arm of the first optical coupler; a first polarization controller having a first end in optical communication with the third port of the four port circulator and having a second end; a second optical coupler that includes a first arm, a second arm, a third arm and a fourth arm, the first arm of the second optical coupler in optical communication with the second end of the first polarization controller, the third arm of the second optical coupler that includes a sample arm of an interferometer, the sample arm in optical communication with an OCT probe, the fourth arm of the second optical coupler in optical communication with a reference mirror, wherein the fourth arm is a reference arm of the interferometer; a three port optical circulator having a first port, a second port, and a third port, the second port of the three port optical coupler in optical communication with second arm of the second optical coupler; a second delay line having a first end in optical communication with the fourth arm of the first optical coupler and having a second end in optical communication with a second arm of the second optical coupler, wherein light entering the second delay line is delayed by ($\tau/2$); and a pair of first and second balanced photodetectors, wherein the first photodetector is in optical communication with the fourth port of the four port circulator and the second photodetector is in optical communication with the third port of the three port circulator.

In one embodiment, the invention relates to an apparatus for increasing the repetition rate in a tunable light source. The apparatus includes a three port optical circulator; a two by two interferometric switch having four ports, the first port of the switch being in optical communication with the second port of the three port circulator; a first delay line having a delay of (τ/2) and having a first end in optical communication with the second port of the switch and a second end in optical communication with a first mirror; a second delay line having a delay of (τ/3) and having a first end in optical communication with the third port of the switch and a second end in optical communication with a mirror, wherein sweep light leaving the third port of the three port circulator is delayed by (2τ/3) and (τ/3) relative to sweep light entering the first port of the three port circulator.

In one embodiment, the invention relates to a method of illuminating a sample. The method includes the steps of passing a first sweep pulse of light through a first delay stage to delay the light by either an amount substantially equal to (τ) or 0; passing the first sweep pulse of light from the first delay stage through a second delay stage to delay the light by a further amount substantially equal to (τ/2) or 0; combining the first sweep pulse of light with a second sweep pulse of light and illuminating a sample with the combined first sweep pulse and the second sweep pulse of light using an optical coherence tomography probe. In one embodiment, the total delay of light leaving the fourth port of the four port circulator is substantially equal to at least one of 0, τ/2, τ/4, and τ.

In one embodiment, the invention relates to a method for increasing the repetition rate in a tunable light source. The method includes the steps of dividing a light sweep pulse into first and second sweep pulses; reflecting the first sweep pulse; passing the second sweep pulse through a first delay line, reflecting the second sweep pulse passed through the first delay line back through the delay line to form a delayed second sweep pulse; and combining the reflected first sweep pulse and the delayed second sweep pulse. In one embodiment, the method further includes the step of passing the first sweep pulse and the delayed second sweep pulse through a second delay line to form a delayed first sweep pulse and a multiply delayed second sweep pulse; and combining the first sweep pulse, the delayed first sweep pulse, a delayed second sweep pulse and a multiply delayed second sweep pulse.

In one embodiment, the invention relates to a method for increasing the repetition rate in a tunable light source. The method includes the steps of dividing a light sweep pulse into first and second sweep pulses; passing the second sweep pulse through a first delay line to form a delayed second sweep pulse; and multiplexing the first sweep pulse and delayed second sweep pulse using an optical switch. In one embodiment, the method further includes the steps of dividing the light sweep pulse into third and fourth sweep pulses; reflecting a third sweep pulse; passing the fourth sweep pulse through a first delay line, reflecting the fourth sweep pulse passed through the first delay line back through the delay line to form a delayed fourth sweep pulse; and combining the reflected first sweep pulse, the delayed fourth sweep pulse and the delayed second sweep pulse; wherein the third and fourth sweep pulses are the first and second sweep pulses.

In one embodiment, the present invention enables acquisition of interferometric image data at high-repetition rates using optical buffering without degradation of image quality.

BRIEF DESCRIPTION OF THE DRAWINGS

The objects and features of the invention can be understood more completely by referring to the drawings described below and the accompanying descriptions. In the drawings, like numerals are used to indicate like parts throughout the various views.

DETAILED DESCRIPTION

The following description refers to the accompanying drawings that illustrate certain embodiments of the invention. Other embodiments are possible and modifications may be made to the embodiments without departing from the spirit and scope of the invention. Therefore, the following detailed description is not meant to limit the invention. Rather, the scope of the invention is defined by the appended claims.

Embodiments of the invention describe improved methods, systems, and devices, such as optical buffers, interferometer switches, and other elements arranged according to specific configurations for use with various data collection and imaging modalities such as optical coherence tomography.

In general, the invention relates to methods and apparatuses for increasing the repetition rate or rate at which the tunable frequencies of a swept source can be swept. These methods and apparatuses increase the repetition rate of a tunable light source by replicating a certain portion of the sweep of the light source. Typically, these light sources use either a piezo-actuated fiberoptic tunable filter or an electrostatic microelectromechanical (MEMs) tunable filter. An oscillating, periodic waveform applied to the filter sweeps the optical frequency of the laser output back and forth over a spectral range that depends on the amplitude and shape of the applied voltage, the dynamics of the filter movement, and the optical characteristics of the laser.

For most high-speed tunable lasers, the relationship between the applied voltage and the emission wavelength is highly nonlinear. Moreover, the optical characteristics of the laser output during the up-sweep (short to long wavelength) period usually differ substantially from the optical characteristics of the laser output during the down-sweep (long to short wavelength) period. The maximum repetition rate of the laser is limited by the properties of the optical components of the laser, while the effective duty cycle is limited by the non-linearity and asymmetry of the laser emission. For lasers that have an the effective duty cycle of less than 50%, it is possible to increase the sweep repetition frequency above the frequency of the electronic excitation by using an optical buffer that time multiplexes the laser output during periods in which the laser is normally off. In this discussion the light output from the swept laser (or delayed within an optical buffer) will be referred to as the sweep pulse.

Figure 1:
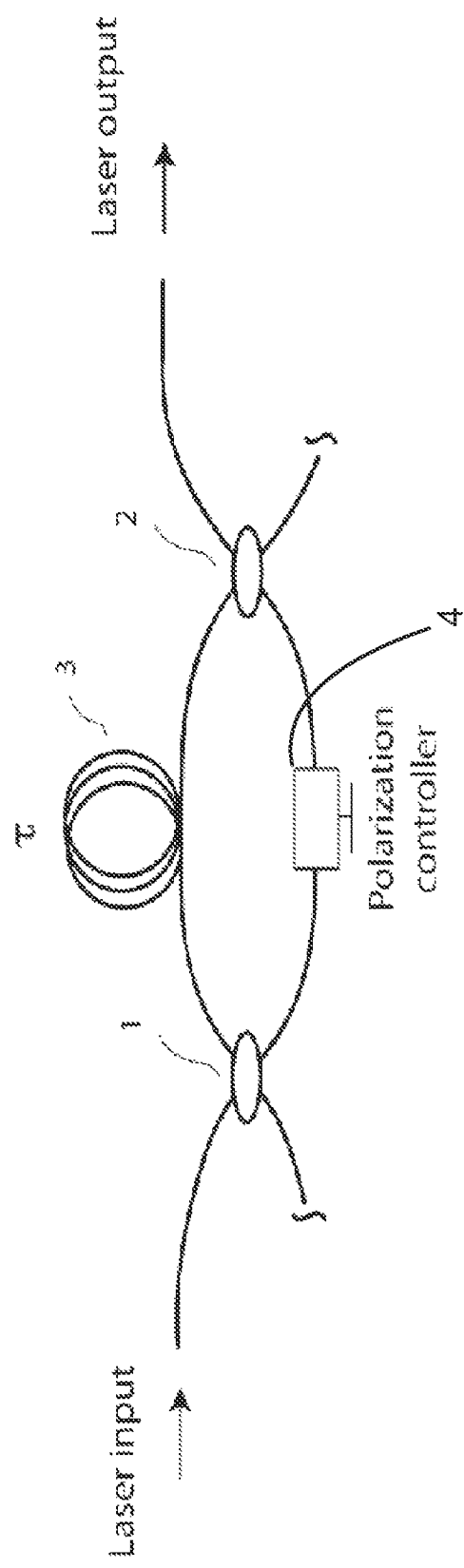
FIG. 1 is a block diagram showing a laser that includes an optical buffer known to the prior art.

FIG. 1 illustrates an optical buffer configuration from the prior art. The first optical coupler 1 splits the light from the sweep pulse into two paths, one that passes through a spool of optical fiber 3 and the other that passes through an adjustable polarization controller 4. Before it recombines with the other path in the second optical coupler 2, the sweep pulse that passes through the spool of optical fiber 3 is delayed by a period of time $\tau=nL/c$, where n and L are the refractive index and length of the fiber, respectively, and c is the speed of light in free space.

Figure 1A:
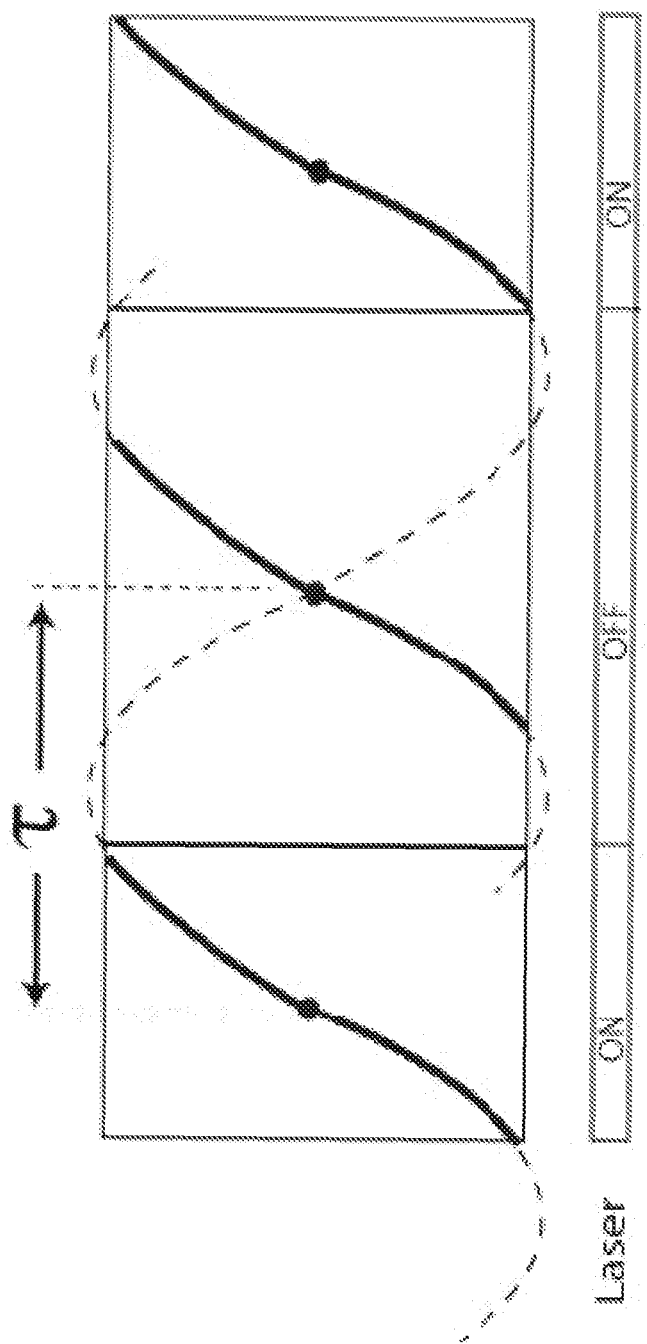
FIG. 1A is a graph of a sweep period of the laser shown in FIG. 1 and various "on" and "off" states.

L is set to make $\tau$ equal to approximately half of a full period of the laser sweep cycle. As shown in FIG. 1A the laser is turned on only during the useful portion of the sweep period (the interval during which the laser produces an output with the desired optical quality). The original and delayed sweep pulses (the light traveling along the first path and the light delayed within the optical fiber, respectively) combine at the output of the second coupler, effectively doubling the effective sweep repetition rate of the laser.

In this prior-art configuration of the buffer, a polarization controller is adjusted to align the polarization states of the delayed and original versions of the laser output. For this configuration, alignment of the polarization states is required when the doubler is used for OCT imaging systems and other systems in which a polarization-sensitive semiconductor amplifier is used after the buffer to boost the laser power. Polarization alignment avoids or mitigates birefringence-induced variations in signal amplitudes in OCT and other interferometric sensing systems. If the polarization states are misaligned, the relative strengths of signals acquired on alternate sweeps of the laser can vary markedly in relation to the birefringence of the sample or bending-induced birefringence of the optical fibers in the sample and reference paths. These signal variations can produce distracting stripe artifacts in OCT images or generate noise in spectrophotometric measurements.

Figure 2:
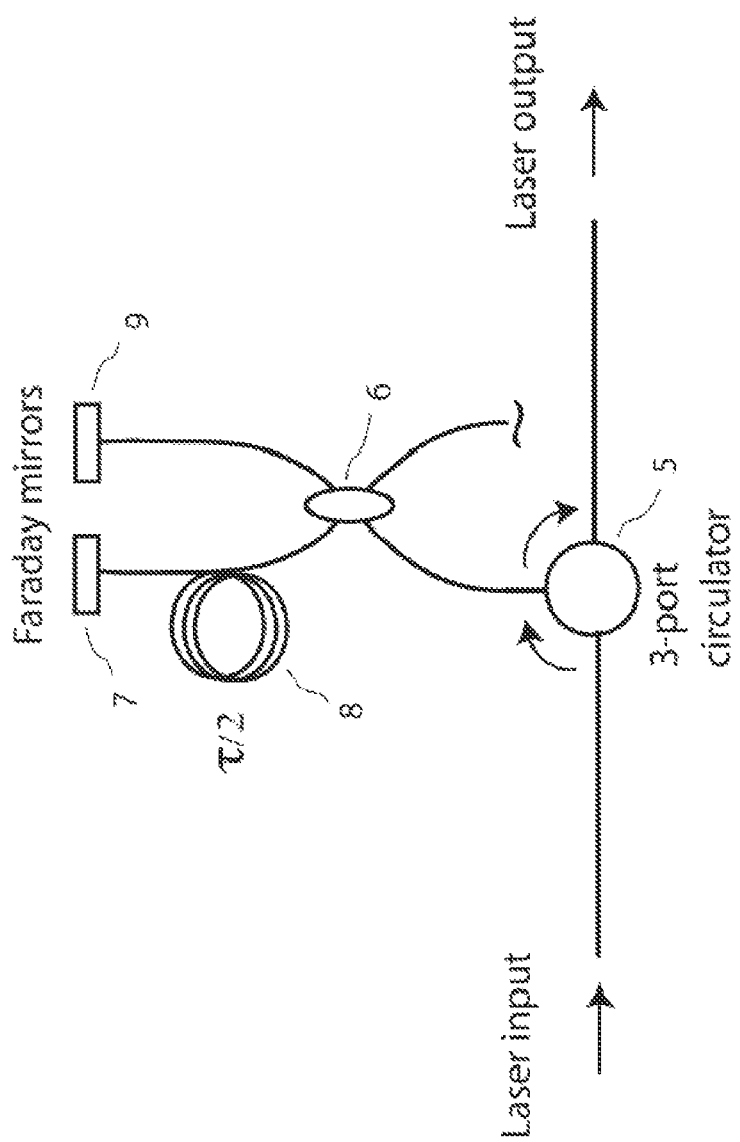
FIG. 2 is a block diagram showing one embodiment of an optical buffer that matches the polarization states of the original and delayed versions of the laser output in accordance with an illustrative embodiment of the invention.

FIG. 2 shows an embodiment of the invention in which a swept laser is in optical communication with an optical buffer that inherently aligns the polarization states of the time-multiplexed copies of the optical sweep pulse without the need for an adjustable polarization controller. An optical circulator 5 directs the sweep pulse from the laser to an optical coupler 6 that splits the light into two sweep pulses. The first sweep pulse reflects from a Faraday mirror 9 and passes back through the coupler 6 and the circulator 5 to the laser output. The second sweep pulse first passes through a delay line or delay coil 8 such as a spool of fiber, where it is delayed by a time interval ($\tau/2$), before it reflects from a second Faraday mirror 7, passes once again through the spool of fiber 8, and then through the coupler 6 and circulator 5 to the laser output. That is, both configurations produce two sweeps within an interval of time ($2\tau$) by delaying the original laser sweep by a length of time ($\tau$) and recombining the original and delayed versions of the sweep pulse at the output.

However, in the embodiment of the invention shown in FIG. 2, because both the original and delayed sweep pulses reflect from Faraday mirrors 7, 9 and the second sweep pulse passes through the spool 8 twice, the polarization states of both sweep pulses remain aligned at the output of the buffer in spite of birefringence variations in the optical fibers and other components. Since there is no need for active alignment of a polarization controller, the system cost and complexity are reduced while reliability and lifetime are increased.

Figure 3:
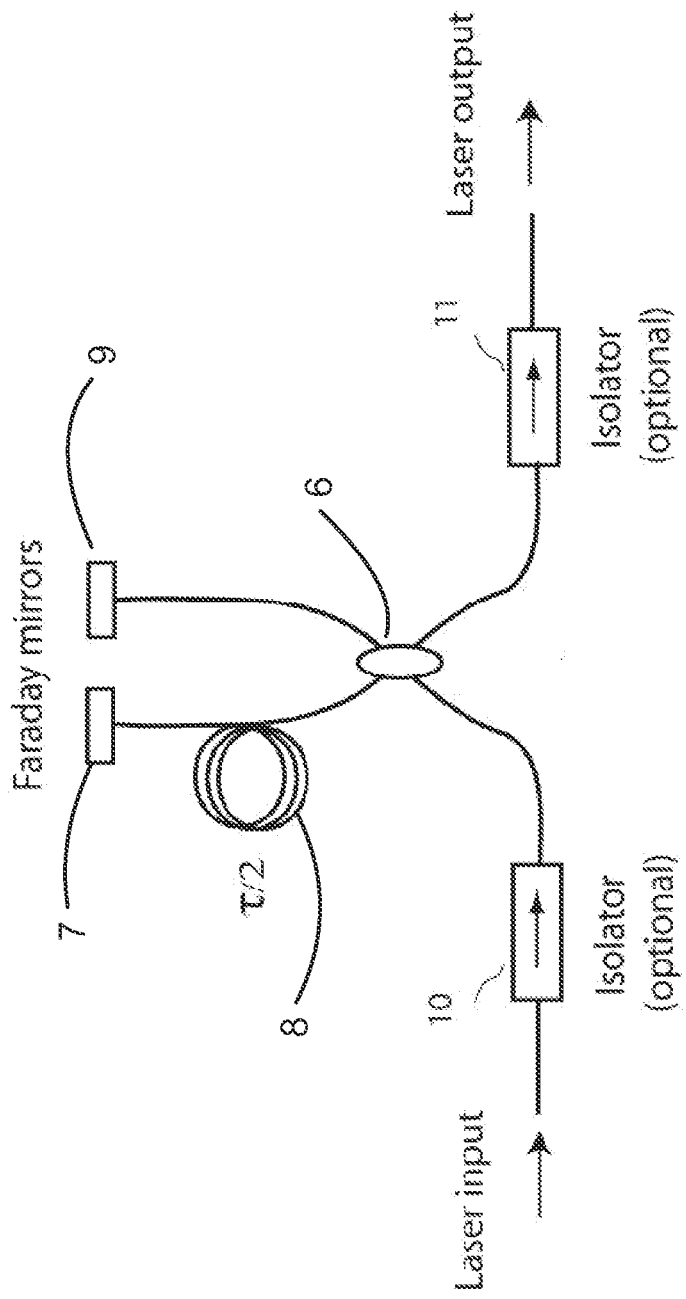
FIG. 3 is a block diagram showing an optical buffer in which two (optional) optical isolators replace the circulator in the embodiment of the optical buffer in FIG. 2 in accordance with an illustrative embodiment of the invention.

In an alternative configuration of the invention shown in FIG. 3, the optical circulator 5 (in the embodiment of FIG. 2) is replaced by an input optical isolator 10 and an output optical isolator 11. In many applications, this alternative configuration is just as effective and can reduce total component costs. If the light source is not sensitive to optical feedback from light reflected from the optical buffer, the input isolator 10 is not required. Similarly, if the components connected to the output of the buffer module are not sensitive to optical feedback, the output isolator 11 is not required. Removing one or both isolators reduces the number of component in the system and, therefore, reduces system complexity and cost.

Figure 4:
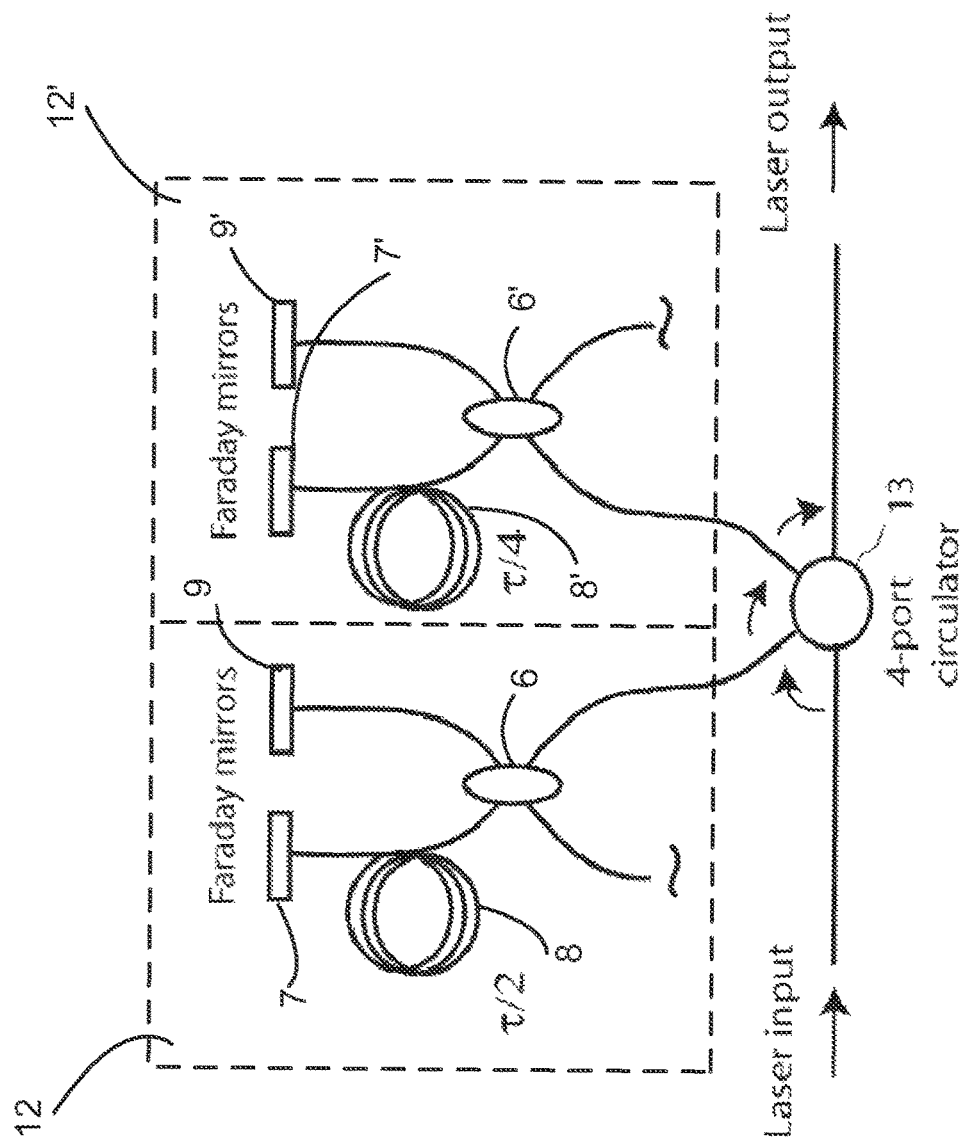
FIG. 4 is a block diagram showing two polarization-aligning optical buffers cascaded to enable quadrupling of the laser repetition rate in accordance with an illustrative embodiment of the invention.

The concept of polarization-aligned optical buffering can be extended from doubling to quadrupling of the laser sweep repetition rate. Quadrupling is applicable to lasers with duty cycles less than or equal to 25%. FIG. 4 shows one embodiment of a quadrupling optical buffer in which a four-port circulator 13 is used to cascade two doubling stages 12, 12'. Each of these stages includes a subset of the elements shown in FIG. 2.

Figure 4A:
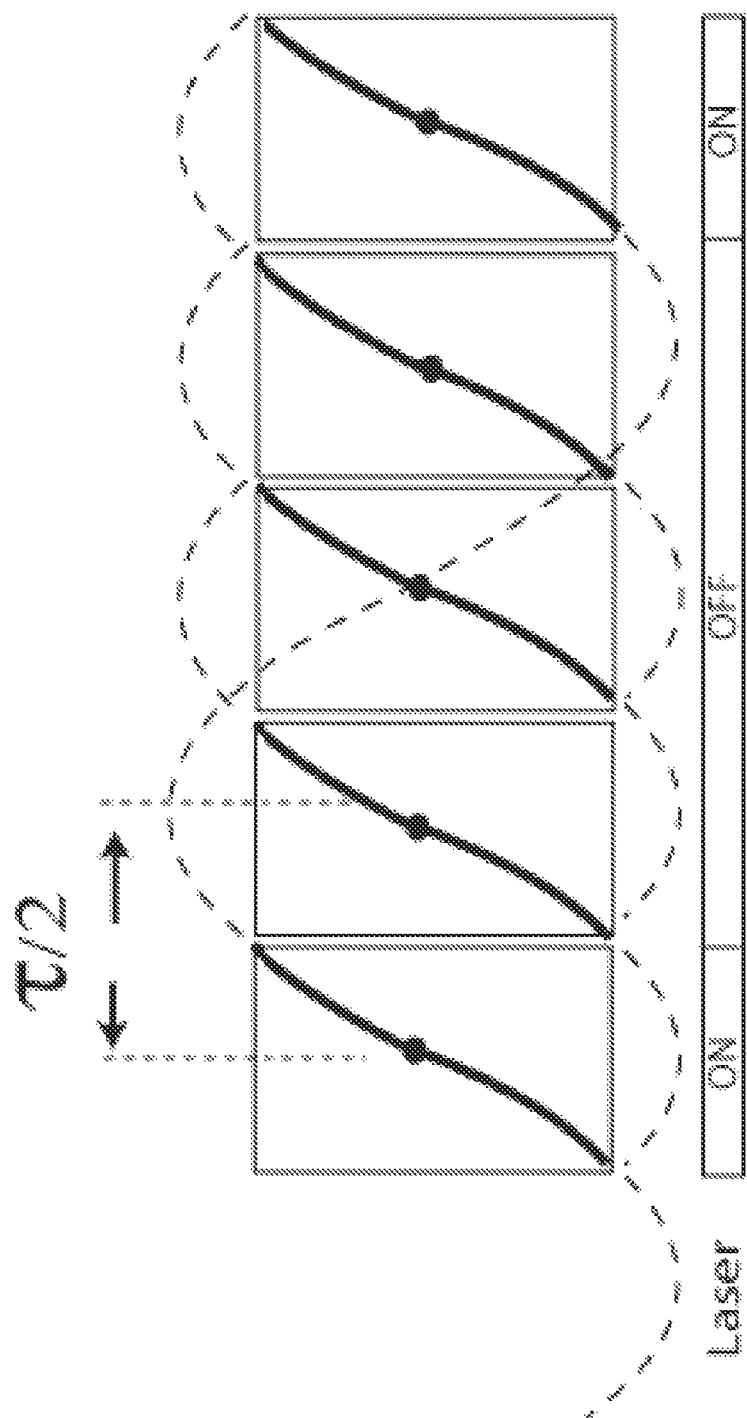
FIG. 4A is a graph depicting the doubling of the sweep repetition rate as a result of the cascaded embodiment of the invention shown in FIG. 4.

As illustrated by FIGS. 4 and 4A, the first doubling stage 12 combines, in the four port circulator 6, the original sweep pulse from the laser input with a delayed sweep pulse delayed by an interval of time ($\tau$) due to the passage of the sweep pulse through the delay line 8, twice. The second doubling stage 12' delays both of these sweep pulses by an interval of time ($\tau/2$) and recombines them with the output of the first stage. In this manner, four sweeps appear at the output within the repetition period ($2\tau$). In more detail, light from the four port circulator 13 is directed toward the first stage 12 where it is treated as described in the embodiment shown in FIG. 2, forming two sweep pulses one delayed by (τ) from the other. These two sweep pulses propagate to the circulator 13 where they are sent to the second stage 12'.

In this second doubling stage 12', the first sweep pulse, which was previously undelayed, is split into two paths by coupler 6'. One path leads to Faraday mirror 9'. The portion of the previously undelayed sweep pulse traveling this path is reflected by the Faraday mirror 9' back through coupler 6' to the circulator 13 to the laser output. This sweep pulse remains undelayed.

The second portion of the previously undelayed sweep pulse split by coupler 6' passes through the delay coil of fiber 8' to Faraday mirror 7' and is reflected back through the delay coil 8' and through the coupler 6' and the four port circulator 13 to the laser output. Because the delay coil of fiber 8' is chosen to introduce a delay of (τ/4) during each pass, the previously undelayed sweep pulse arrives at the output with a delay of (τ/2).

The sweep pulse that had been delayed by the first stage 12 by (τ) next passes from the four port circulator 13 to the coupler 6'. As shown, a portion of the sweep pulse, previously delayed by (τ/2), is directed toward mirror 9'. Mirror 9' reflects the sweep pulse back through coupler 6' through the four port circulator 13 to the laser output. As a result the sweep pulse which was previously delayed by (τ/2) is now delayed by (τ/4). The result is that what was once a single output has been reformed into sweep pulses with delays of 0, τ/4, τ/2, and τ relative to the original laser sweep as shown in FIG. 4A.

Figure 5:
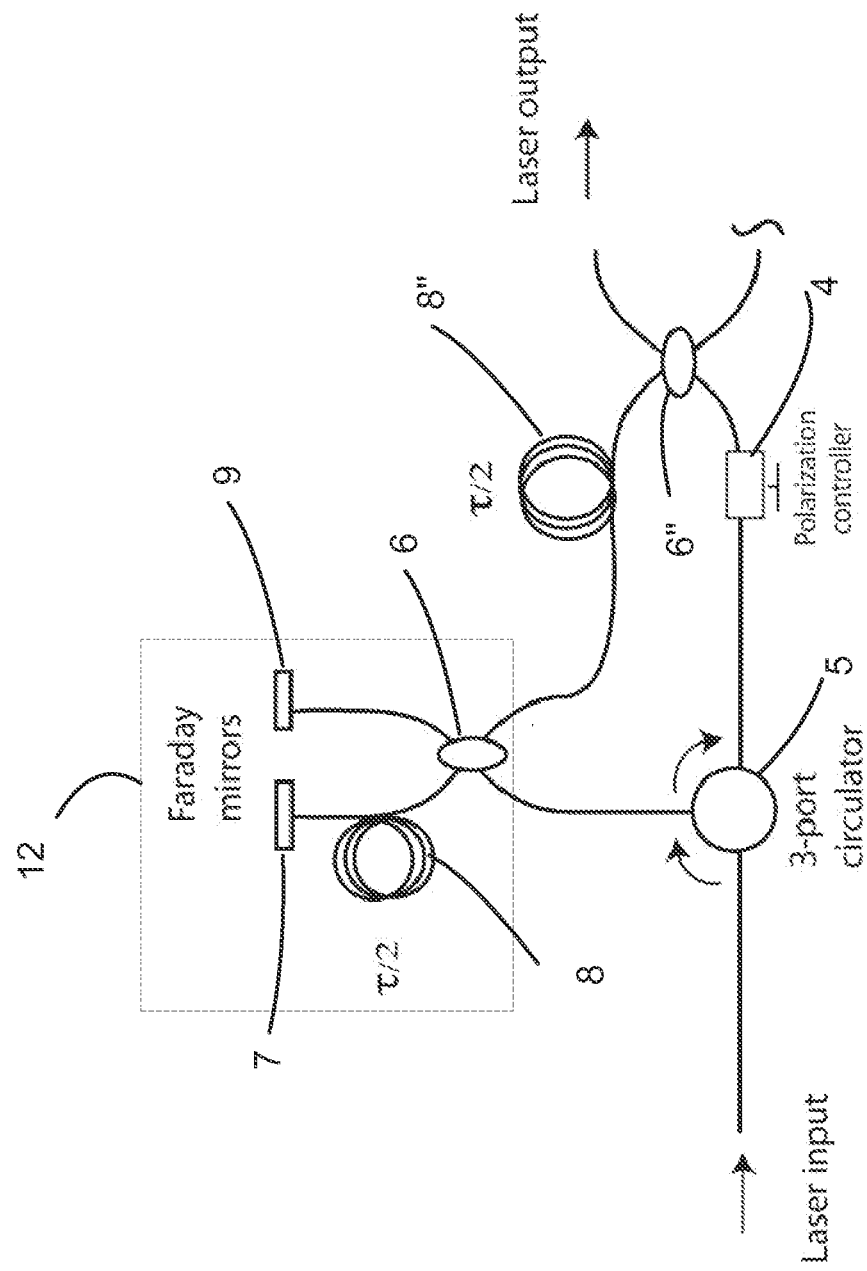
FIG. 5 is a block diagram showing two stages that are cascaded to enable quadrupling of the laser repetition rate in accordance with an illustrative embodiment of the invention.
Figure 6:
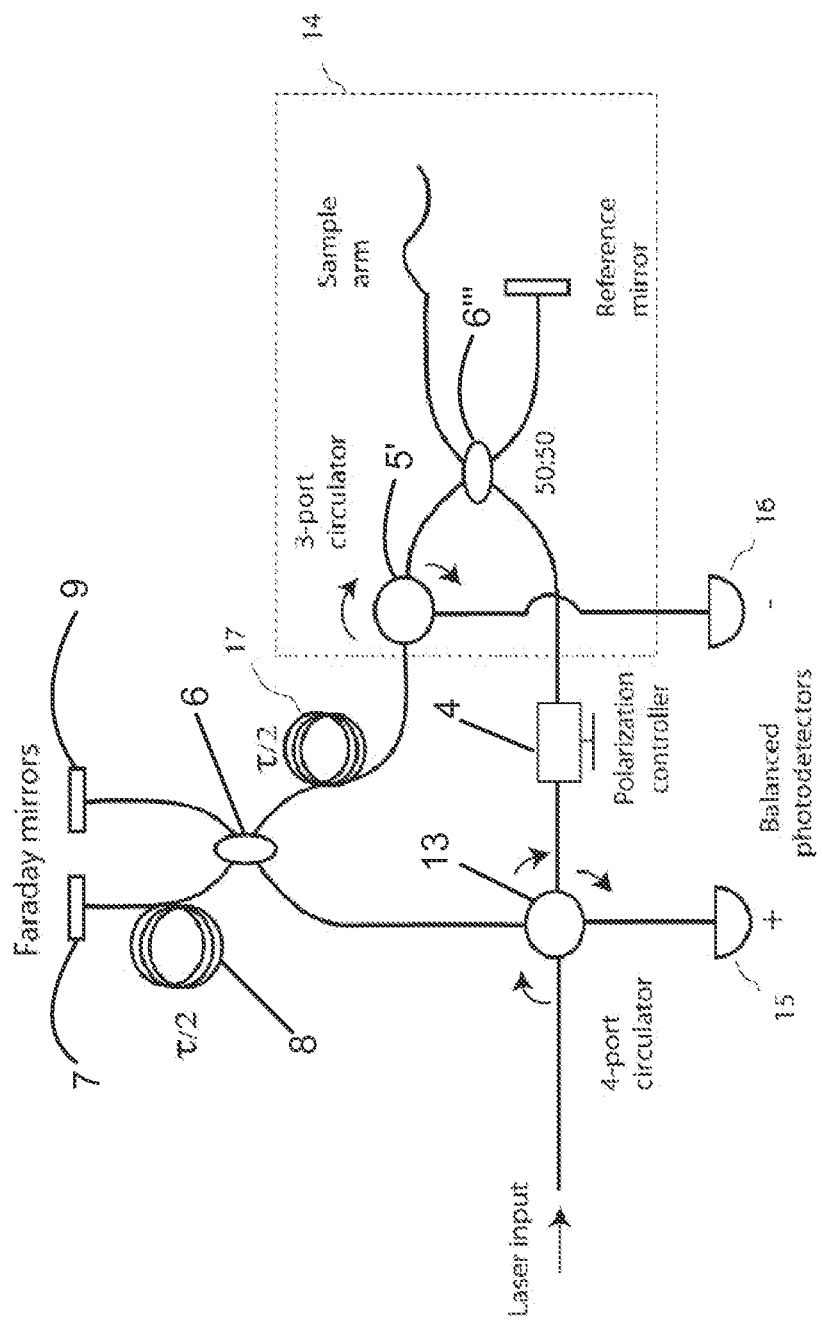
FIG. 6 is a block diagram showing a polarization-aligning buffer combined with a balanced interferometer to quadruple the repetition rate in an optical coherence tomography system, while improving the optical throughput in accordance with an illustrative embodiment of the invention.

FIG. 5 circulator shows an alternative embodiment of a quadrupling optical buffer in which a buffer, a three-port circulator 5, and doubling stage 12 (described with respect to FIG. 2) are in optical communication with the output of polarization-aligned optical buffer of delay line 8", polarization controller 4 and coupler 6". In this embodiment the sweep pulse from the three-port circulator 5 passes though a coupler 6 as described in respect to FIG. 2. The resulting sweep pulse that passes back through the coupler 6 to the three port circulator 5 has delays of 0 and (τ). This sweep pulse passes through a polarization controller 4 before passing to a coupler 6". The sweep pulse, with delays of 0 and (τ), exit the other arm of coupler 6 and passes through a delay coil of fiber 8" which delays that sweep pulse by (τ/2) before passing it to coupler 6".

This results in sweep pulse light leaving the delay line 8" having total delays of (τ) and (3τ/2). The end result is that light from the swept source exits the output with delays of 0, (τ/2), (3τ/2), and τ with respect to the original laser sweep. The polarization controller 4 maintains the polarization states of the two paths.

The minimum optical loss of this buffer is reduced to 3 dB, compared to 6 dB for the configuration in FIG. 4. The 3 dB and 6 dB losses referred to here are theoretical minimums based on 50% losses through 1 or 2 couplers, respectively. However, the adjustable polarization controller is required for aligning the polarization states of the optical outputs, thereby increasing the cost.

Although they eliminate the need for a polarization controller to align the polarization states of the original and delayed sweeps, the optical buffers depicted in FIG. 2-4 have optical losses of (3-7 dB), similar to those of optical buffers in the prior art. This problem arises from a 3 dB loss incurred in each unused output of each optical coupler (generally numeral 6). FIGS. 6-10 show additional embodiments of optical buffers with substantially lower optical losses.

In the embodiment of the polarization-aligning buffer in FIG. 5, the fraction of the light from the optical coupler that does not pass through the optical circulator is lost. In the embodiment shown in FIG. 6, optical efficiency is improved by connecting both outputs of the coupler 6 through optical circulators 13 and 5' to opposing inputs of a balanced interferometer 14 to form the interferometric portion of an OCT system. A second fiber spool or delay line 17 delays one of the inputs to enable a quadrupling of the laser repetition rate. Two photodetectors (15, 16) receive the reference and sample light returning from the interferometer and generate OCT interference signals with opposite phases. A polarization controller 4 equalizes the polarization states of the original and delayed versions of the laser sweeps.

In more detail, the laser input enters the four-port circulator 13 as before and the sweep pulse propagates to the coupler 6. Light either passes directly to Faraday mirror 9, or through a delay line 8 to mirror 7 before being reflected back to the coupler as discussed with respect to FIG. 2. The difference is that light that would normally be lost to the unused arm of the coupler 6 is instead passed through a second delay line 17 which imposes an additional delay of (τ/2) before passing the sweep pulse light to a three port circulator 5'. Light from coupler 6 is then delayed (τ/2), (3τ/2) or (τ). Light from one arm of the three port circulator 5' then is sent to a coupler 6'''.

The remaining light from coupler 6 which has been delayed either (τ/2) or 0, passes back to the four-port circulator 13 and to a polarization controller 4 before entering the coupler 6'''. Sweep pulse light that propagates to coupler 6''' from circulator 13 is then combined with sweep pulse light from circulator 5' before being passed the sample and reference arms of the interferometer 14. This light has delays of 0, (τ/2), (3τ/2) or (τ) relative to the original laser sweep. Sweep pulse light from the reference arm or sample arm is then returned to the coupler 6''' and sent to circulators 5' and 13, which in turn direct the light to balanced photodetectors 15 and 16.

Figure 7:
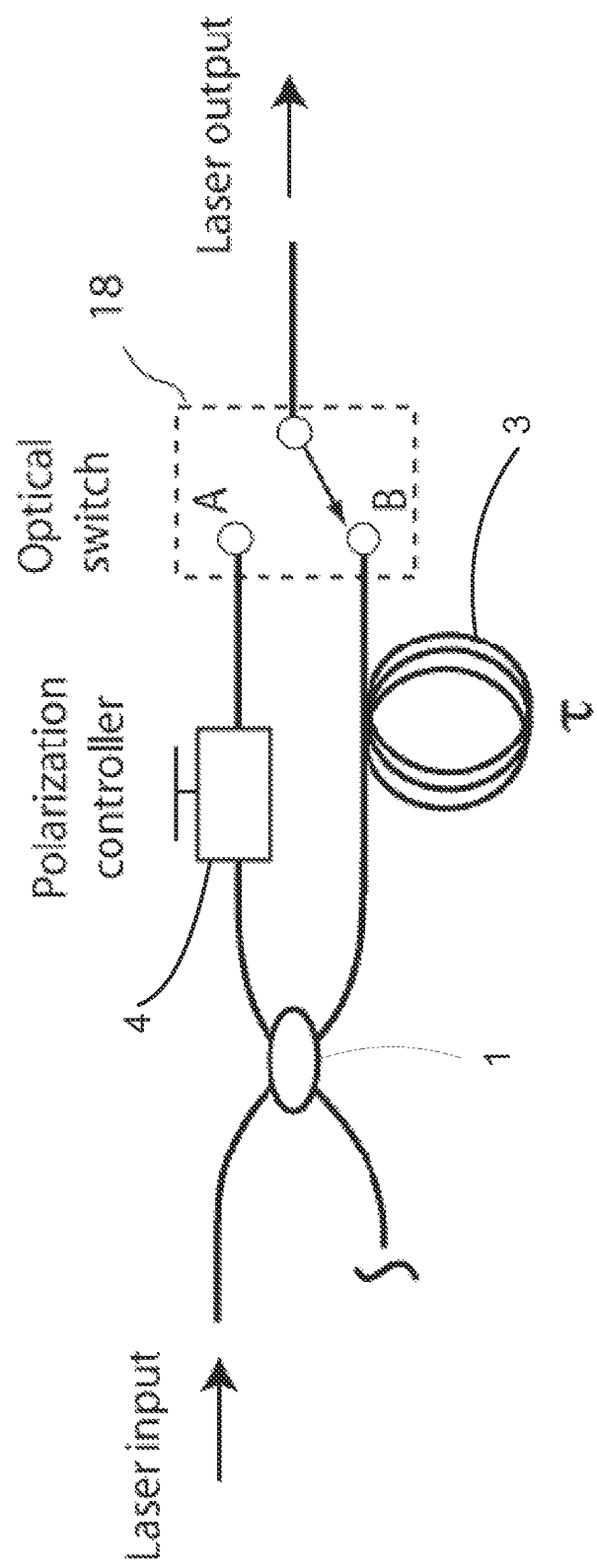
FIG. 7 is a block diagram of another embodiment of an optical buffer configuration, configured as a repetition-rate doubler, in which one 2×2 coupler has been replaced with an optical switch to improve transmission efficiency in accordance with an illustrative embodiment of the invention.
Figure 7A:
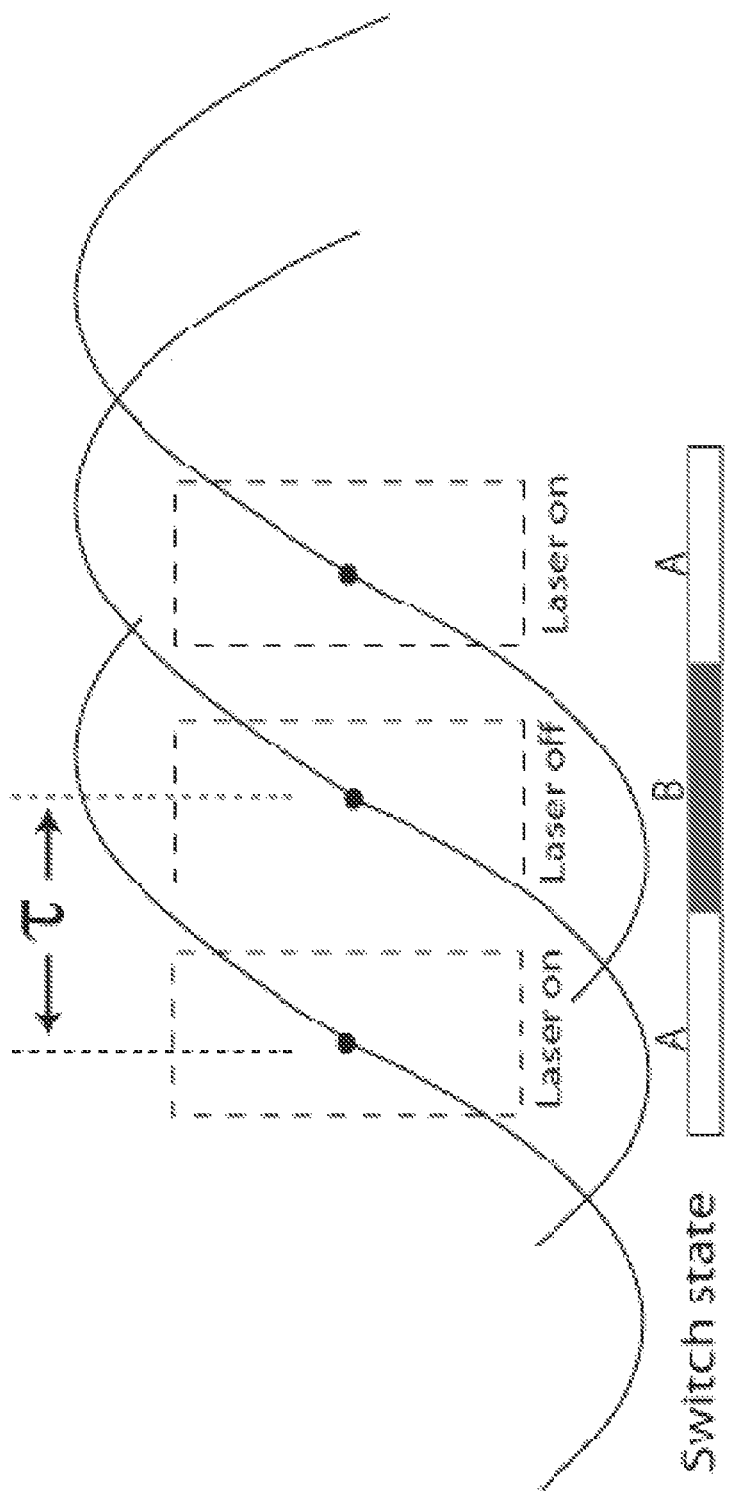
FIG. 7A is a graph depicting the sweep repetition rate as a result of the switch state of the embodiment of the invention shown in FIG. 7.

FIG. 7 shows a further aspect of the invention that includes a high-speed 1×2 optical switch 18 to improve optical throughput. As illustrated in FIG. 7A, the position of the switch ('A' or 'B') is synchronized with the periods during which the original and delayed versions of the laser sweep that propagate to the output of the optical coupler 1. The switch 18 routes the available laser power stored in the delay line 3 to the buffer output during the period when the laser is turned off. As a result no laser power is lost, except for the excess losses in the delay line 3 and switch 18. Both electro-optic and MEMs optical switches that are suitable for high-repetition optical buffering according to this embodiment are available with switching times as short as about 300 ns and insertion losses less than about 1 dB.

Figure 8:
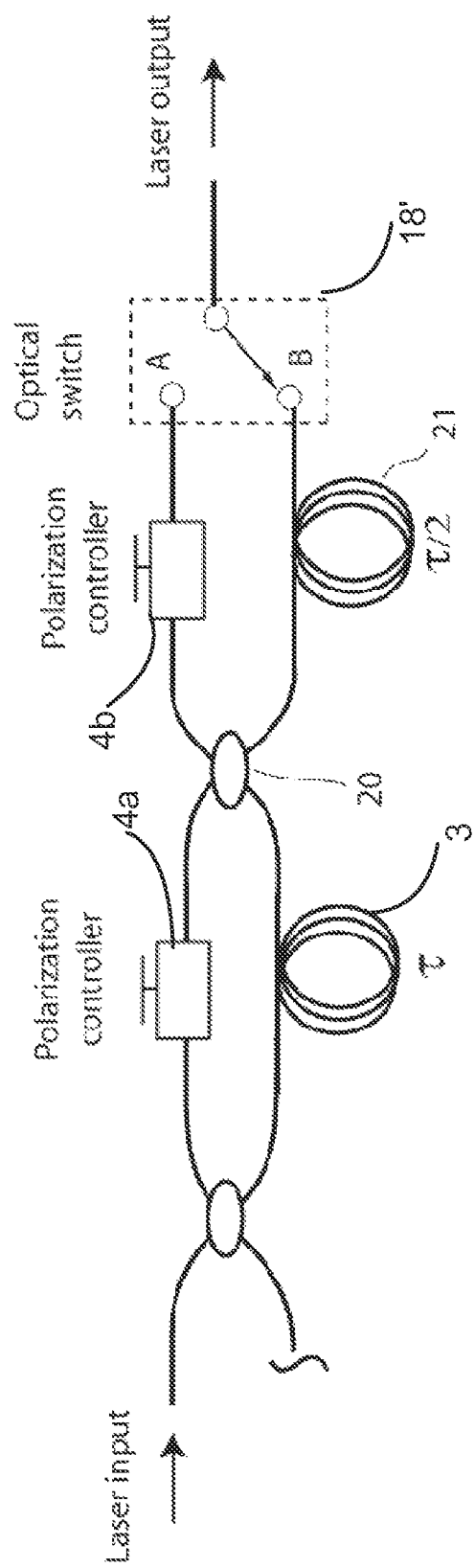
FIG. 8 is a block diagram of a switched optical buffer configuration that enables quadrupling of the repetition rate of a laser sweep in accordance with an illustrative embodiment of the invention.
Figure 8A:
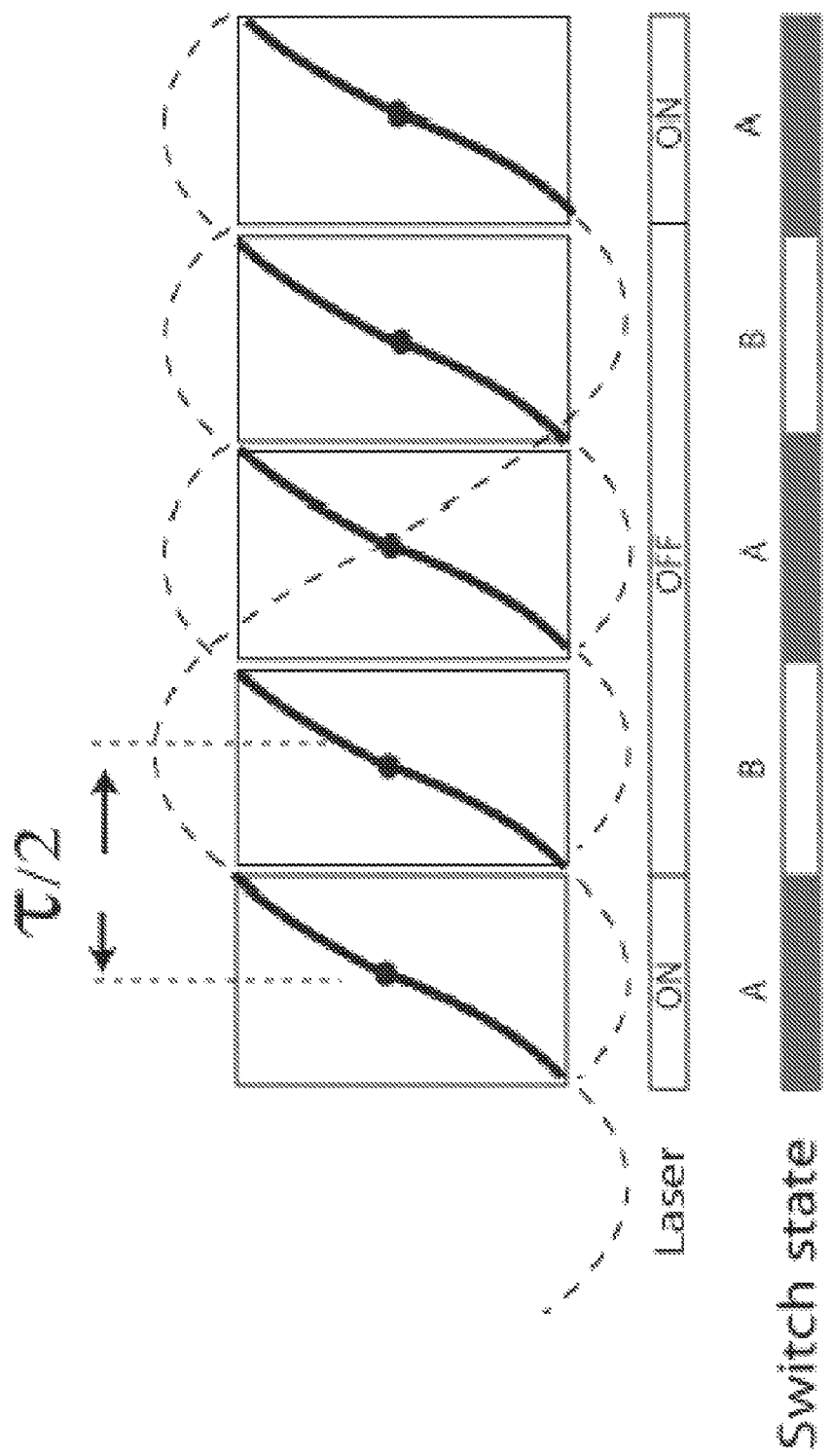
FIG. 8A is a graph depicting the quadrupling of the sweep repetition rate as a result of the switch states of embodiment of the invention shown in FIG. 8.

The concept of switch-mode optical buffering can be extended from repetition-rate doubling to repetition-rate quadrupling by using the embodiment shown in FIG. 8. This embodiment, which is similar to that of FIG. 7, adds an additional coupler 20, and an additional two polarization controllers 4a, 4b and a delay line 21 that adds an additional delay of (τ/2). Only a small optical loss (typically less than 1 dB) is incurred as a result of excess losses in a second optical coupler 20 and a second delay line 21, that are added to the single-stage switched buffer. The optical switch 18, switching between A and B allows light to go from the polarization controller 4b or the second delay line 21 to the output. Synchronization of the dual-stage switched buffer is shown in FIG. 8A. Light that propagates to the laser output is delayed by 0, (τ), (τ/2) and (3τ/2) relative to the original sweep of the laser.

Figure 9:
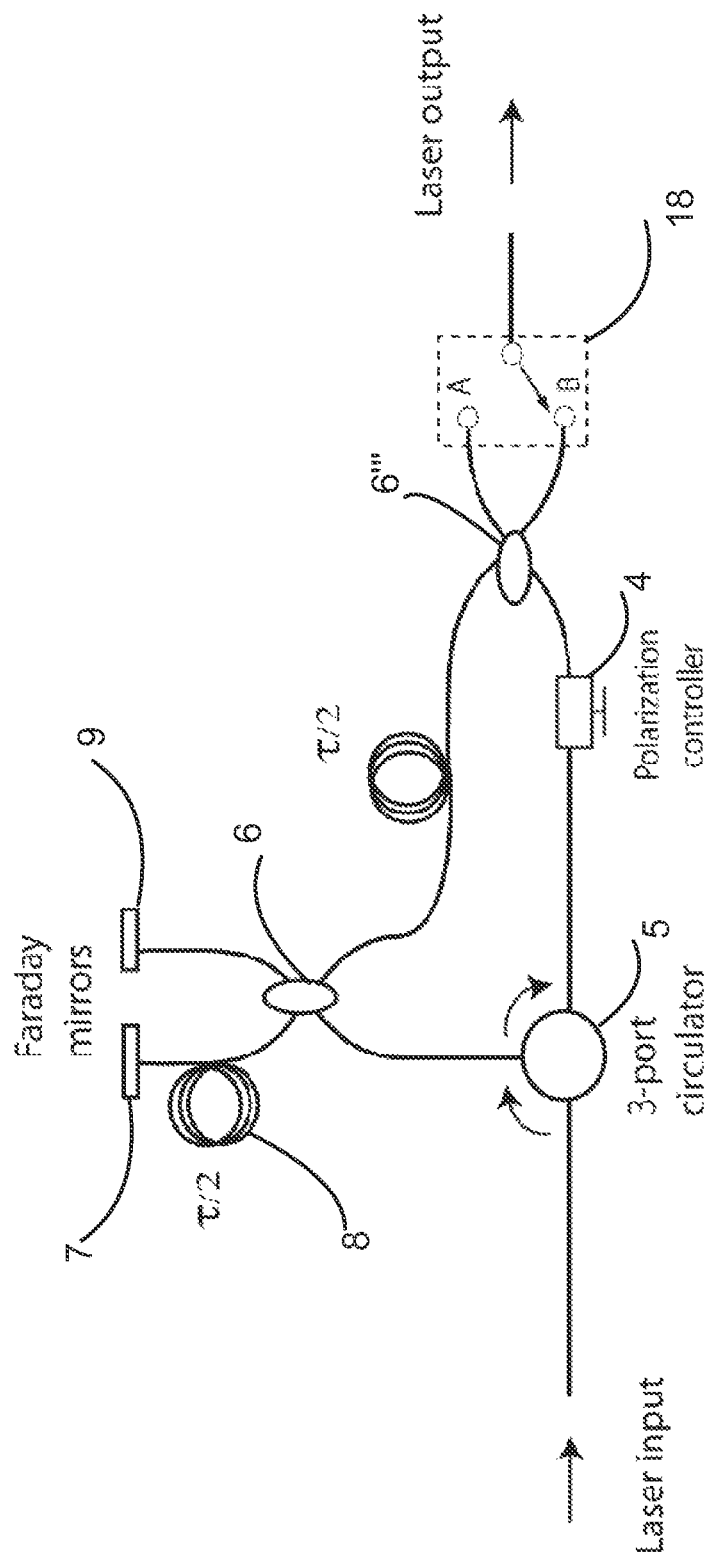
FIG. 9 is a block diagram of a switched optical buffer configuration that enables quadrupling of the repetition rate of a laser sweep in accordance with an illustrative embodiment of the invention.
Figure 10:
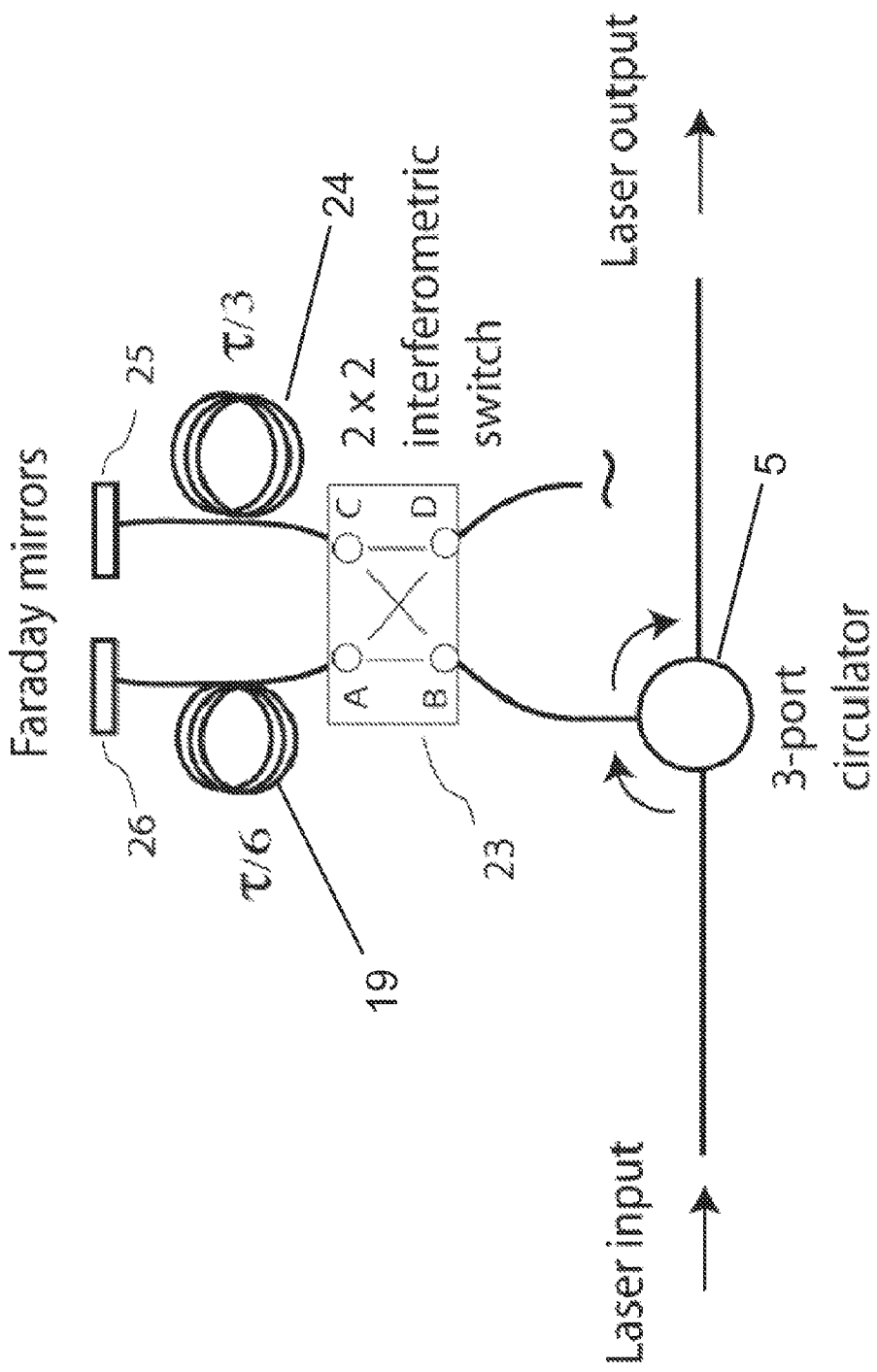
FIG. 10 is a block diagram of a polarization-aligning buffer that incorporates a 2×2 interferometric switch to improve efficiency in accordance with an illustrative embodiment of the invention.

The benefits of both aspects of the present invention—polarization alignment and switch-mode coupling—are realized in the embodiments depicted in FIGS. 9 and 10. In the embodiment shown in FIG. 9, the embodiment shown in FIG. 5 is again used but with the unused arm of coupler 6″ in FIG. 5, shown as coupler 6‴ in FIG. 9, being connected to one pole of the optical switch 18. Light that would normally be lost by coupler 6″ in FIG. 5 is switched by high speed switch 18 to the laser output. Thus, in this embodiment, polarization-aligned and switch-mode buffering stages are connected in series to allow high-efficiency quadrupling of the laser repetition rate, using only a single polarization controller 4.

In yet another embodiment of the invention, as shown in FIG. 10, no polarization controllers are required and high efficiency is achieved with a high-speed 2×2 interferometric switch 23. Employed in high-speed telecom networks, high-speed 2×2 lithium-niobate interferometric switches can be made with nanosecond switching times and relatively low excess losses. These switches function analogously to a 2×2 splitter with an arbitrarily adjustable coupling ratio. In this embodiment light from the three port circulator 5 is switched to Faraday mirrors 26 and 25 through delay lines 19 and 24 respectively.

Figure 10A:
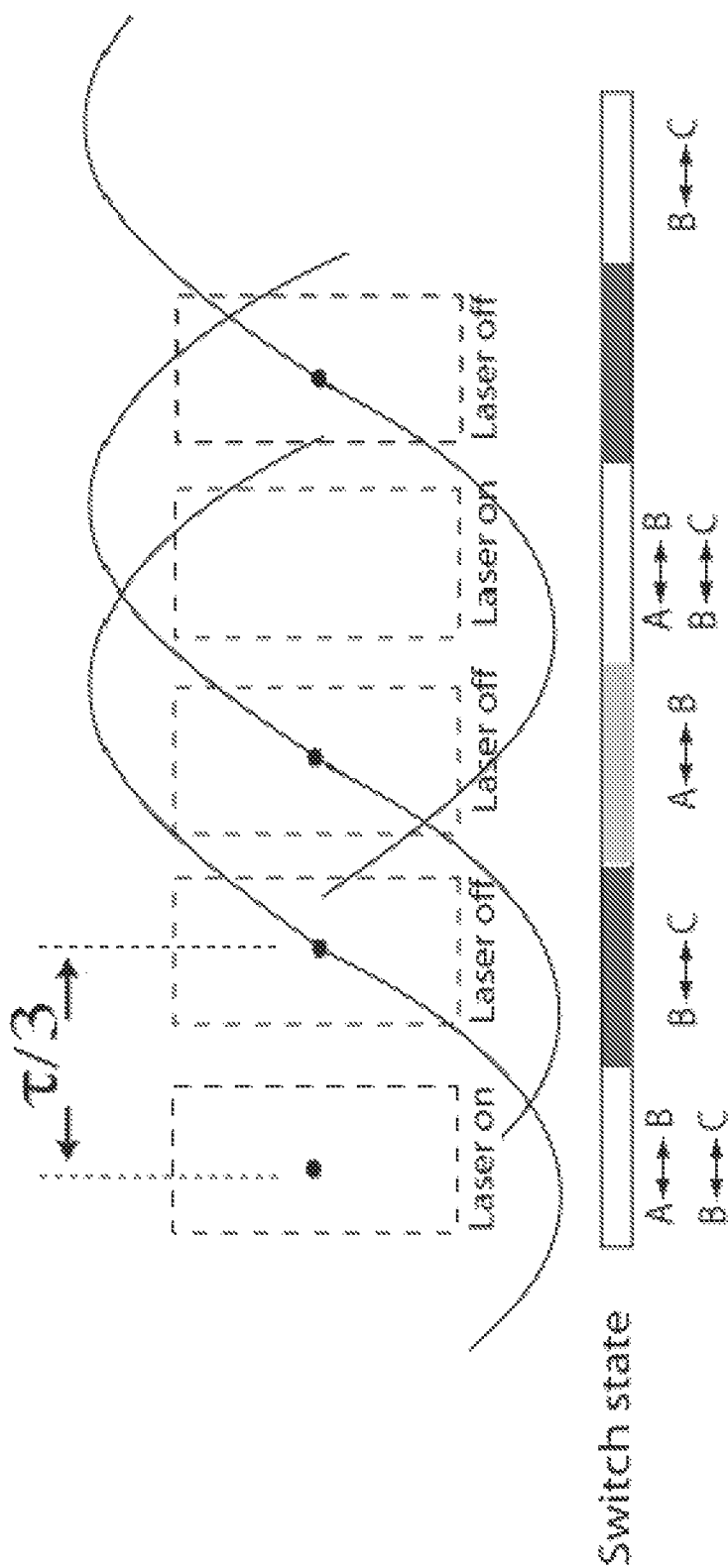
FIG. 10A is a graph depicting the quadrupling of the sweep repetition rate as a result of the switch states of the embodiment of the invention shown in FIG. 10.

FIG. 10A depicts the operating states of the high-efficiency switched optical buffer of FIG. 10. During the period when the laser is turned on, the switch 23 performs the function of a 1×2 coupler, splitting the laser input received at port B into two equal-intensity sweep pulses. A first sweep pulse travels through a delay line 19 ($\tau/6$), and reflects from a first Faraday mirror 26. The sweep pulse then travels back again through the delay line 19 for another delay of ($\tau/6$). After this total delay of ($2\tau/3$), the switch 23 is reconfigured to route light directly from port A to port B, thereby passing the second sweep pulse to the optical circulator 5 and then to the laser output of the buffer.

A second sweep pulse travels through a delay line 24 ($\tau/3$), reflects from a second Faraday mirror 25, and travels back again through the delay line 24 ($\tau/3$). After this total delay of ($\tau/3$), the switch 23 is reconfigured to route light directly from port C to port B, thereby passing the first reflected sweep pulse to the optical circulator 5 and then to the laser output of the buffer. This buffer module configuration therefore produces two sweeps followed by a time ($\tau/3$) where there is no optical output. This time gap can be used, for example, for data processing or storage.

In the description, the invention is discussed in the context of optical coherence tomography; however, these embodiments are not intended to be limiting and those skilled in the art will appreciate that the invention can also be used for other imaging and diagnostic modalities, instruments for interferometric sensing, or optical systems in general.

The terms light and electromagnetic radiation are used interchangeably herein such that each term includes all wavelength (and frequency) ranges and individual wavelengths (and frequencies) in the electromagnetic spectrum. Similarly, the terms device and apparatus are also used interchangeably. In part, embodiments of the invention relate to or include, without limitation: sources of electromagnetic radiation and components thereof; systems, subsystems, and apparatuses that include such sources; mechanical, optical, electrical and other suitable devices that can be used as part of or in communication with the foregoing; and methods relating to each of the forgoing. Accordingly, a source of electromagnetic radiation can include any apparatus, matter, system, or combination of devices that emits, re-emits, transmits, radiates or otherwise generates light of one or more wavelengths or frequencies.

One example of a source of electromagnetic radiation is a laser. A laser is a device or system that produces or amplifies light by the process of stimulated emission of radiation. Although the types and variations in laser design are too extensive to recite and continue to evolve, some non-limiting examples of lasers suitable for use in embodiments of the invention can include tunable lasers (sometimes referred to as swept source lasers), superluminescent diodes, laser diodes, semiconductor lasers, mode-locked lasers, gas lasers, fiber lasers, solid-state lasers, waveguide lasers, laser amplifiers (sometimes referred to as optical amplifiers), laser oscillators, and amplified spontaneous emission lasers (sometimes referred to as mirrorless lasers or superradiant lasers).

The aspects, embodiments, features, and examples of the invention are to be considered illustrative in all respects and are not intended to limit the invention, the scope of which is defined only by the claims. Other embodiments, modifications, and usages will be apparent to those skilled in the art without departing from the spirit and scope of the claimed invention.

The use of headings and sections in the application is not meant to limit the invention; each section can apply to any aspect, embodiment, or feature of the invention.

Throughout the application, where compositions are described as having, including, or comprising specific components, or where processes are described as having, including or comprising specific process steps, it is contemplated that compositions of the present teachings also consist essentially of, or consist of, the recited components, and that the processes of the present teachings also consist essentially of, or consist of, the recited process steps.

In the application, where an element or component is said to be included in and/or selected from a list of recited elements or components, it should be understood that the element or component can be any one of the recited elements or components and can be selected from a group consisting of two or more of the recited elements or components. Further, it should be understood that elements and/or features of a composition, an apparatus, or a method described herein can be combined in a variety of ways without departing from the spirit and scope of the present teachings, whether explicit or implicit herein.

The use of the terms "include," "includes," "including," "have," "has," or "having" should be generally understood as open-ended and non-limiting unless specifically stated otherwise.

The use of the singular herein includes the plural (and vice versa) unless specifically stated otherwise. Moreover, the singular forms "a," "an," and "the" include plural forms unless the context clearly dictates otherwise. In addition, where the use of the term "about" is before a quantitative value, the present teachings also include the specific quantitative value itself, unless specifically stated otherwise.

It should be understood that the order of steps or order for performing certain actions is immaterial so long as the present teachings remain operable. Moreover, two or more steps or actions may be conducted simultaneously.

Where a range or list of values is provided, each intervening value between the upper and lower limits of that range or list of values is individually contemplated and is encompassed within the invention as if each value were specifically enumerated herein. In addition, smaller ranges between and including the upper and lower limits of a given range are contemplated and encompassed within the invention. The listing of exemplary values or ranges is not a disclaimer of other values or ranges between and including the upper and lower limits of a given range.

It is to be understood that the figures and descriptions of the invention have been simplified to illustrate elements that are relevant for a clear understanding of the invention, while eliminating, for purposes of clarity, other elements. Those of ordinary skill in the art will recognize, however, that these and other elements may be desirable. However, because such elements are well known in the art, and because they do not facilitate a better understanding of the invention, a discussion of such elements is not provided herein. It should be appreciated that the figures are presented for illustrative purposes and not as construction drawings. Omitted details and modifications or alternative embodiments are within the purview of persons of ordinary skill in the art.

It can be appreciated that, in certain aspects of the invention, a single component may be replaced by multiple components, and multiple components may be replaced by a single component, to provide an element or structure or to perform a given function or functions. Except where such substitution would not be operative to practice certain embodiments of the invention, such substitution is considered within the scope of the invention.

The examples presented herein are intended to illustrate potential and specific implementations of the invention. It can be appreciated that the examples are intended primarily for purposes of illustration of the invention for those skilled in the art. There may be variations to these diagrams or the operations described herein without departing from the spirit of the invention. For instance, in certain cases, method steps or operations may be performed or executed in differing order, or operations may be added, deleted or modified.

Furthermore, whereas particular embodiments of the invention have been described herein for the purpose of illustrating the invention and not for the purpose of limiting the same, it will be appreciated by those of ordinary skill in the art that numerous variations of the details, materials and arrangement of elements, steps, structures, and/or parts may be made within the principle and scope of the invention without departing from the invention as described in the claims.

What is claimed is:

1. An apparatus for increasing a repetition rate in a swept light source comprising:
    a first optical buffer comprising
        a first optical coupler comprising a first arm, a second arm and a third arm;
        a first mirror in optical communication with the second arm of the first optical coupler; and
        a first optical delay line having a first end in optical communication with the third arm of the first optical coupler and a second end in optical communication with a second mirror,
        wherein light entering the first arm of the first optical coupler leaves the first arm of the first optical coupler either delayed by a first amount or substantially undelayed; and
    a second optical buffer, wherein the second optical buffer receives output light from the first optical buffer, the second optical buffer comprising
        a first optical coupler comprising a first arm, a second arm and a third arm;
        a first mirror in optical communication with the second arm of the first optical coupler; and
        a first optical delay line having a first end in optical communication with the third arm of the first optical coupler and a second end in optical communication with a second mirror,
        wherein light entering the first arm of the first optical coupler leaves the first arm of the first optical coupler either delayed by a second amount or substantially undelayed.

2. The apparatus of claim 1 wherein the first and second mirrors are Faraday mirrors.

3. The apparatus of claim 1 further comprising a circulator having a first port, a second port, and a third port,
    wherein the first port of the circulator is configured to receive light from the swept light source; and
    wherein the second port of the circulator is in optical communication with the first arm of the first optical coupler.

4. The apparatus of claim 1 wherein the first amount is selected from the group consisting of $\tau$, $\tau/2$, and $\tau/4$.

5. The apparatus of claim 1, wherein the first optical buffer and the second optical buffer are polarization aligning.

6. The apparatus of claim 1 further comprising
    a second optical coupler comprising a first arm, a second arm and a third arm;
    a third mirror in optical communication with the second arm of the second optical coupler; and
    a second optical delay line having a first end in optical communication with the third arm of the second optical coupler and a second end in optical communication with a fourth mirror; and
    a four port circulator comprising a first port in optical communication with the first arm of the first optical coupler and a second port in optical communication with the first arm of the second optical coupler; a third port in optical communication with the swept light source;
    wherein light entering the first arm of the first optical coupler from the first port of the four port circulator, leaves the first arm of the first optical coupler and enters the first port of the four port circulator either delayed by an amount substantially equal to (0) or ($\tau$); and
    wherein light entering the first arm of the second optical coupler from the second port of the four port circulator, leaves the first arm of the second optical coupler and enters the third port of the four port circulator delayed by an amount substantially equal to 0, ($\tau$), ($\tau/2$) or ($\tau/4$).

7. The apparatus of claim 6 wherein the mirrors are Faraday mirrors.

8. The apparatus of claim 1 wherein the second amount is selected from the group consisting of $\tau$, $\tau/2$, and $\tau/4$.

9. The apparatus of claim 1 wherein the repetition rate is quadrupled by buffering light from the swept source in the first optical buffer and the second optical buffer.

10. The apparatus of claim 1, wherein a duty cycle of the swept light source is less than or equal to 25%.

11. An apparatus for increasing a repetition rate in a tunable light source comprising:
    a first optical buffer comprising:
        a first optical coupler comprising a first arm, a second arm and a third arm;
        a first mirror in optical communication with the second arm of the first optical coupler;
        a first fiber optic delay line, having a first end and a second end, the first end of the first fiber optic delay line in optical communication with the third arm of the first optical coupler, the second end of the first fiber optic delay line in optical communication with a second mirror; and a second optical buffer comprising:
   a first optical coupler comprising a first arm, a second arm and a third arm;
   a first mirror in optical communication with the second arm of the first optical coupler;
   a first fiber optic delay line, having a first end and a second end, the first end of the first fiber optic delay line in optical communication with the third arm of the first optical coupler, the second end of the first fiber optic delay line in optical communication with a second mirror, wherein the second optical buffer receives output light from the first optical buffer.

12. The apparatus of claim 11, wherein the first optical buffer delays light input thereto by a delay selected from the group consisting of 0, $\tau$, $\tau/2$, and $\tau/4$.

13. The apparatus of claim 11, wherein the second optical buffer delays light input thereto by a delay selected from the group of consisting 0, $\tau$, $\tau/2$, and $\tau/4$.

14. The apparatus of claim 11, wherein a first optical buffer and the second optical buffer are polarization aligning.

15. The apparatus of claim 11, wherein a duty cycle of the swept light source is less than or equal to 25%.

* * * * *